United States Patent
Nakayama

(10) Patent No.: US 8,558,908 B2
(45) Date of Patent: Oct. 15, 2013

(54) IMAGE SENSING APPARATUS AND METHOD OF CONTROLLING THE IMAGE SENSING APPARATUS

(75) Inventor: Satoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 13/084,443

(22) Filed: Apr. 11, 2011

(65) Prior Publication Data

US 2011/0187901 A1 Aug. 4, 2011

Related U.S. Application Data

(60) Continuation of application No. 12/701,357, filed on Feb. 5, 2010, now Pat. No. 7,948,523, which is a division of application No. 11/334,992, filed on Jan. 18, 2006, now abandoned.

(30) Foreign Application Priority Data

Jan. 19, 2005 (JP) ................................. 2005-011796

(51) Int. Cl.
*H04N 5/225* (2006.01)
(52) U.S. Cl.
USPC ...................................................... 348/220.1

(58) Field of Classification Search
USPC ...................................................... 348/220.1
See application file for complete search history.

(56) References Cited

U.S. PATENT DOCUMENTS

| | | | | | |
|---|---|---|---|---|---|
| 5,712,680 | A | * | 1/1998 | Hieda | 348/220.1 |
| 7,948,523 | B2 | * | 5/2011 | Nakayama | 348/220.1 |
| 2002/0159652 | A1 | * | 10/2002 | Izume et al. | 382/266 |
| 2003/0214600 | A1 | * | 11/2003 | Kido | 348/362 |
| 2005/0046724 | A1 | * | 3/2005 | Kagaya | 348/333.01 |
| 2006/0044453 | A1 | * | 3/2006 | Lee | 348/345 |

* cited by examiner

*Primary Examiner* — James Hannett
(74) *Attorney, Agent, or Firm* — Carter, DeLuca, Farrell & Schmidt, LLP

(57) ABSTRACT

An image sensing apparatus including an image sensing unit that converts light into an electric signal corresponding to a quantity of incident light, and periodically outputs an image signal obtained by the conversion at intervals of a predetermined period, a mode switch that switches among a plurality of image sensing modes including at least a special image sensing mode and a normal image sensing mode, a delay unit that delays an image signal by the predetermined period, an adder that adds the image signal output from the image sensing unit and the image signal output from the delay unit in set proportions, and outputs an image signal obtained by the addition, and a setting unit that sets the proportions used by the adder, according to the image sensing mode selected by the mode switch.

8 Claims, 15 Drawing Sheets

F I G. 4
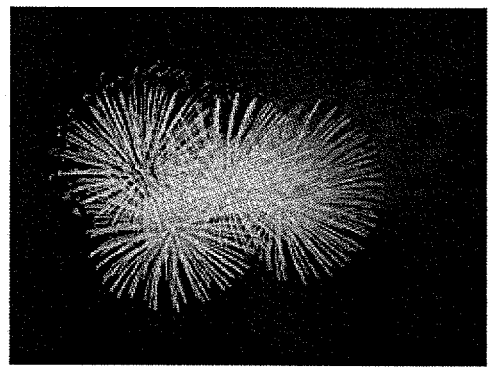

F I G. 14
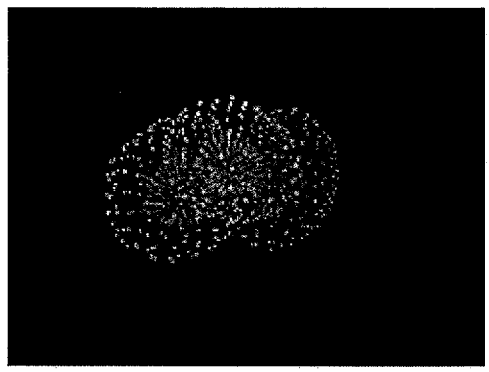

IMAGE SENSING APPARATUS AND METHOD OF CONTROLLING THE IMAGE SENSING APPARATUS

CROSS REFERENCE OF RELATED APPLICATIONS

This application is a Continuation of U.S. patent application Ser. No. 12/701,357 filed on Feb. 5, 2010, which is a Divisional of U.S. patent application Ser. No. 11/334,992 filed on Jan. 18, 2006 which claims the benefit of Japanese Patent Application No. 2005-011796 filed on Jan. 19, 2005, the contents of which are hereby incorporated by reference herein in their entirety.

FIELD OF THE INVENTION

The present invention relates to an image sensing apparatus having a firework image sensing mode and, more particularly, to a control method for image processing in the image sensing apparatus.

BACKGROUND OF THE INVENTION

A "firework mode" specialized for taking firework images in image sensing apparatuses such as electronic cameras has been disclosed (see, for example, Japanese Patent Laid-Open No. 2001-311977). Because the human eye has such a characteristic as to maintain an afterimage, long trails of light are perceived in a firework with the eye. In contrast, in image sensing, only trails of light corresponding to the shutter speed are imaged. For example, in still image sensing in a firework mode, therefore, image sensing control such as automatically decreasing the shutter speed is performed to express tails of light of a firework. Special exposure control such as setting the amount of exposure to a value suitable for a firework is also performed in image sensing in a firework mode, because the suitable amount of exposure cannot be obtained by the ordinary exposure control under a dark firework condition.

When a normal image sensing mode is selected in still image sensing, the shutter speed is controlled so that an amount of exposure becomes proper, and an image signal corresponding to the quantity of light to which an image sensing unit during the shutter released period is exposed is generated. In the normal image sensing mode, a shutter speed of, for example, about 1/30 second is a limit of low shutter speed for prevention of blurriness due to camera shake or blurriness due to movement of an object. When a firework image sensing mode is selected, the diaphragm is controlled so that the shutter speed is set to a predetermined value for the firework mode, and an image signal corresponding to the quantity of light to which the image sensing unit is exposed during the shutter released period is generated. While long trails of light are perceived in a firework with the human eye since the human eye has such a characteristic as to maintain an afterimage, only trails of light corresponding to the shutter speed of an electronic camera or the like are imaged in actual image sensing with the electronic camera, as described above. Therefore, it is effective to continue exposure for about 2 seconds in image sensing on a firework to express trails of light in the firework. In ordinary cases, therefore, the shutter speed determined in advance for a firework mode is about 2 seconds. FIG. 14 shows an image of an aerial firework taken at a shutter speed of 1/30 second. A firework which will be seen in a tailed state with the human eye is imaged as dots, as shown in FIG. 14. FIG. 15 shows an image of the same aerial firework taken at a shutter speed of 2 seconds. A firework can be expressed in a tailed state as shown in the figure, if the exposure period is 2 seconds.

As another processing when a firework image sensing mode is selected, control such as fixing white balance at a color temperature close to that of sunlight is performed. In firework image sensing, automatic white balancing is difficult to perform, and white balance close to that used for an image taken under sunlight is used in order to express the color of a firework approximately to the color recognized with the human eye.

The conventional image sensing apparatus has drawbacks described below. Noise is noticeable in a dark portion expressing the dark sky imaged as a background. Also, under the influence of smoke of fireworks, a dark portion is often expressed unsuitably blight. Further, while a tailed state can be expressed in a still image by decreasing the shutter speed, a tailed state cannot be expressed in moving image sensing by adjusting the exposure period, because the exposure period is limited to the moving image update period. There is also a problem that in a case where the audio frequency characteristics are optimized for audio recording in the normal image sensing mode, powerful bass sound of a firework cannot be reproduced.

SUMMARY OF THE INVENTION

The present invention has been made in consideration of the above situation, and has as its first object to enable a high-quality firework image having a suitably dense dark portion to be obtained in an image sensing apparatus.

A second object of the present invention is to enable expression of a tailed state of a firework even in moving image sensing.

A third object of the present invention is to enable audio recording most suitable for use with imaging of a firework.

According to the present invention, the foregoing object is attained by providing an image sensing apparatus including: an image sensing unit that converts light into an electric signal corresponding to a quantity of incident light, and periodically outputs an image signal obtained by the conversion at intervals of a predetermined period; a mode switch that switches among a plurality of image sensing modes including at least a special image sensing mode and a normal image sensing mode; a delay unit that delays an image signal by the predetermined period; an adder that adds the image signal output from the image sensing unit and the image signal output from the delay unit in set proportions, and outputs an image signal obtained by the addition; and a setting unit that sets the proportions used by the adder, according to the image sensing mode selected by the mode switch, wherein the delay unit delays the image signal obtained by addition performed by the adder, and wherein the setting unit sets the proportion of the image signal output from the delay unit higher in the special image sensing mode than in the normal image sensing mode.

According to the another aspect of the present invention, the foregoing object is attained by providing an image sensing apparatus including: an image sensing unit that converts light into an electric signal corresponding to a quantity of incident light, and outputs an image signal obtained by the conversion; a mode switch that switches among a plurality of image sensing modes including at least a firework image sensing mode and a normal image sensing mode; a gamma characteristics changing unit that changes gamma characteristics including a first gamma characteristic used in the firework image sensing mode and a second gamma characteristic used in the normal image sensing mode; and a gamma conversion unit that, when switch to the firework image sensing mode is made by the mode switch, performs gamma conversion on the image signal output from the image sensing unit by using the first gamma characteristic selected by the gamma characteristics changing unit, wherein the first gamma characteristic comprises a characteristic having the effect of suppressing a low luminance in comparison with the second gamma characteristic.

According to the another aspect of the present invention, the foregoing object is attained by providing an image sensing apparatus including: an image sensing unit that converts light into an electric signal corresponding to a quantity of incident light, and outputs an image signal obtained by the conversion; a mode switch that switches among a plurality of image sensing modes including at least a firework image sensing mode and a normal image sensing mode; an edge enhancement amount changing unit that changes edge enhancement amounts including a first edge enhancement amount used in the firework image sensing mode and a second edge enhancement amount used in the normal image sensing mode; and an edge enhancing unit that, when switch to the firework image sensing mode is made by the mode switch, performs edge enhancement on the image signal output from the image sensing unit by using the first edge enhancement amount selected by the edge enhancement amount changing unit.

In still another aspect of the present invention, the foregoing object is attained by providing an image sensing apparatus including: an image sensing unit that converts light into an electric signal corresponding to a quantity of incident light, and outputs an image signal obtained by the conversion; a mode switch that switches among a plurality of image sensing modes including at least a firework image sensing mode and a normal image sensing mode; a chromaticity adjustment amount changing unit that changes chromaticity adjustment amounts including a first chromaticity adjustment amount used in the firework image sensing mode and a second chromaticity adjustment amount used in the normal image sensing mode; and a chromaticity adjusting unit that, when switch to the firework image sensing mode is made by the mode switch, performs chromaticity adjustment on the image signal output from the image sensing unit by using the first chromaticity adjustment amount selected by the chromaticity adjustment amount changing unit.

In still another aspect of the present invention, the foregoing object is attained by providing a method of controlling an image sensing apparatus, including: converting light into an electric signal corresponding to a quantity of incident light, and outputting an image signal obtained by the conversion; switching among a plurality of image sensing modes including at least a firework image sensing mode and a normal image sensing mode; changing gamma characteristics to a first gamma characteristic when the firework image sensing mode is selected and to a second gamma characteristic when the normal image sensing mode is selected; and performing gamma conversion on the image signal using the selected gamma characteristic, wherein the first gamma characteristic comprises a characteristic having the effect of suppressing a low luminance in comparison with the second gamma characteristic.

In still another aspect of the present invention, the foregoing object is attained by providing a control method including: converting light into an electric signal corresponding to a quantity of incident light, and outputting an image signal obtained by the conversion; switching among a plurality of image sensing modes including at least a firework image sensing mode and a normal image sensing mode; changing edge enhancement amounts to a first edge enhancement amount when the firework image sensing mode is selected and to a second edge enhancement amount when the normal image sensing mode is selected; and performing edge enhancement on the image signal using the selected edge enhancement amount.

In still another aspect of the present invention, the foregoing object is attained by providing a control method including: converting light into an electric signal corresponding to a quantity of incident light, and outputting an image signal obtained by the conversion; switching among a plurality of image sensing modes including at least a firework image sensing mode and a normal image sensing mode; changing chromaticity adjustment amounts to a first chromaticity adjustment amount when the firework image sensing mode is selected and to a second chromaticity adjustment amount when the normal image sensing mode is selected; and performing chromaticity adjustment on the image signal using the selected chromaticity adjustment amount.

In still another aspect of the present invention, the foregoing object is attained by providing an image sensing apparatus including: an image sensing unit that converts light into an electric signal corresponding to a quantity of incident light, and periodically outputs an image signal obtained by the conversion at intervals of a predetermined period; a mode switch that switches among a plurality of image sensing modes including at least a firework image sensing mode and a normal image sensing mode; a delay unit that delays an image signal by the predetermined period; and an adder that, when switch to the firework image sensing mode is made by the mode switch, adds the image signal output from the image sensing unit and the image signal output from the delay unit in predetermined proportions, and outputs an image signal obtained by the addition, wherein the delay unit delays the image signal obtained by addition performed by the adder.

In still another aspect of the present invention, the foregoing object is attained by providing a method of controlling an image sensing apparatus, including: converting in an image sensing unit light into an electric signal corresponding to a quantity of incident light, and periodically outputting from the image sensing unit an image signal obtained by the conversion at intervals of a predetermined period; switching among a plurality of image sensing modes including at least a firework image sensing mode and a normal image sensing mode; delaying an image signal by the predetermined period; and adding in predetermined proportions the image signal output from the image sensing unit and the delayed image signal, and outputting an image signal obtained by the addition when the firework image sensing mode is selected, wherein the image signal obtained by addition is further delayed.

In still another aspect of the present invention, the foregoing object is attained by providing an image sensing apparatus that records sound together with an image, the device including: a sound input unit that inputs sound, converts the sound into an audio signal and outputs the audio signal; a mode switch that switches among a plurality of image sensing modes including at least a firework image sensing mode and a normal image sensing mode; a frequency characteristics changing unit that changes frequency characteristics including a first audio frequency characteristic used in the firework image sensing mode and a second audio frequency characteristic used in the normal image sensing mode; and a characteristic conversion unit that, when switch to the firework image sensing mode is made by the mode switch, makes audio frequency conversion of the audio signal output from the audio input unit by using the first audio frequency characteristic selected by the frequency characteristics changing unit, wherein the first audio frequency characteristic comprises a characteristic having the effect of enhancing bass sound in comparison with the second audio frequency characteristic.

In still another aspect of the present invention, the foregoing object is attained by providing a method of controlling an image sensing apparatus that records sound together with an image, the method including: inputting sound, converting the input sound into an audio signal and outputting the audio signal; switching among a plurality of image sensing modes including at least a firework image sensing mode and a normal image sensing mode; changing frequency characteristics to a first audio frequency characteristic when the firework image sensing mode is selected and to a second audio frequency characteristic when the normal image sensing mode is selected; and making audio frequency conversion of the audio signal using the selected audio frequency characteristic, wherein the first audio frequency characteristic comprises a characteristic having the effect of enhancing bass sound in comparison with the second audio frequency characteristic.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing an example of an image processed on the basis of the gamma characteristic in the normal image sensing mode according to the first embodiment of the present invention;

FIG. 14 is a diagram showing an example of a still image of a firework taken by 1/30 second exposure in the conventional art.

DETAILED DESCRIPTION OF THE PREFERRED EMBODIMENTS

Preferred embodiments of the present invention will be described in detail in accordance with the accompanying drawings.

First Embodiment

Figure 1:
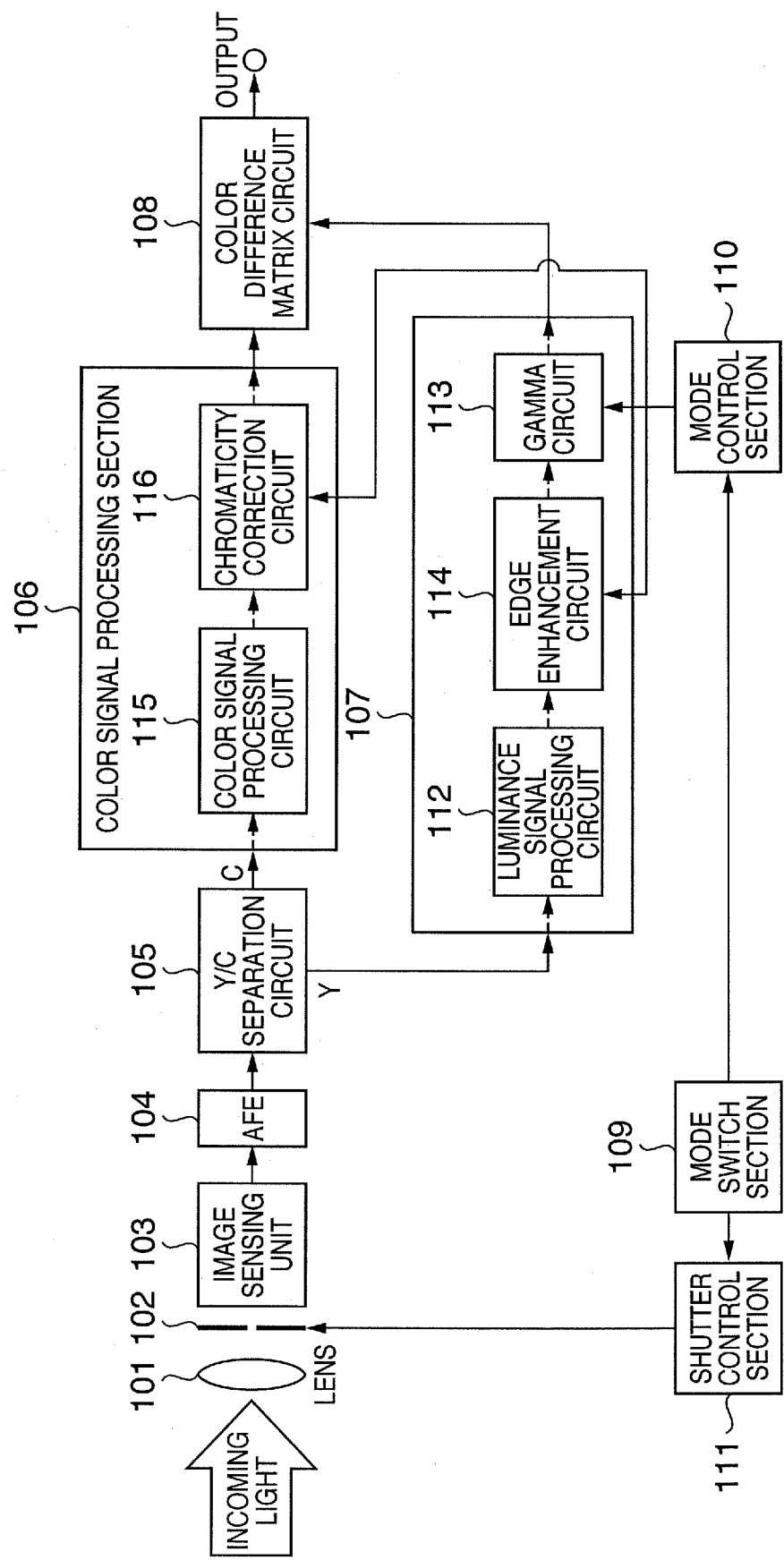
FIG. 1 is a block diagram showing the configuration of an image sensing apparatus according to a first embodiment of the present invention.

FIG. 1 is a block diagram of an image sensing system of an electronic camera schematically showing a first embodiment of the present invention. In FIG. 1, reference numeral 101 denotes a lens; reference numeral 102, a diaphragm for adjustment of the amount of exposure; reference numeral 103, an image sensing unit; reference numeral 104, an analog front end (AFE) that samples an output from the image sensing unit and performs A/D conversion of the sample output; reference numeral 105, a luminance/color (Y/C) separation circuit; reference numeral 106, a color signal processing section; reference numeral 107, a luminance signal processing section; reference numeral 108, a color difference matrix circuit; reference numeral 109, a mode switch section; reference numeral 111, a shutter control section; reference numeral 112, a luminance signal processing circuit included in the luminance signal processing section 107; reference numeral 113, a gamma circuit that is included in the luminance signal processing section 107, and that performs gamma conversion processing; reference numeral 110, a mode control section that supplies gamma curve data to the gamma circuit 113 and that controls the gamma circuit 113, the edge enhancement circuit 114 and the chromaticity correction circuit 116; reference numeral 114, an edge enhancement circuit that is included in the luminance signal processing section 107, and that performs edge enhancement processing; reference numeral 115, a color signal processing circuit included in the color signal processing section 106; and reference numeral 116, a chromaticity correction circuit that is included in the color signal processing section 106 and that corrects the level of a color signal.

Light entering the lens 101 is controlled for suitable exposure by the diaphragm 102 and undergoes photoelectric conversion in the image sensing unit 103. An image signal obtained by photoelectric conversion in the image sensing unit 103 undergoes sampling and A/D conversion in the analog front end 104 and is separated into a luminance signal and a color signal in the Y/C separation circuit 105. The color signal separated in the Y/C separation circuit 105 undergoes signal processing relating to colors, such as white balancing, in the color signal processing circuit 115, then undergoes chromaticity correction in the chromaticity correction circuit 116, and is thereafter input to the color difference matrix circuit 108. On the other hand, the luminance signal separated in the Y/C separation circuit 105 is input to the luminance signal processing section 107, undergoes processing relating to luminance in the luminance signal processing circuit 112, processing for edge enhancement or the like in the edge enhancement circuit 114 and gamma conversion processing in the gamma circuit 113, and is thereafter input to the color difference matrix circuit 108. Then a color difference signal is formed in the color difference matrix circuit 108 and is output from this circuit. In the first embodiment of the present invention, the diaphragm 102 also functions as a shutter for controlling the exposure period at the time of still image sensing. In still image sensing, the exposure period is determined by closing the diaphragm 102 after the image sensing unit has started accumulating electric charge.

When a normal image sensing mode is selected in the mode switch section 109, the mode control section 110 provides a normal gamma curve to the gamma circuit 113. When a firework image sensing mode is selected in the mode switch section 109, the mode control section 110 provides a gamma curve suitable for firework image sensing to the gamma circuit 113.

Figure 2:
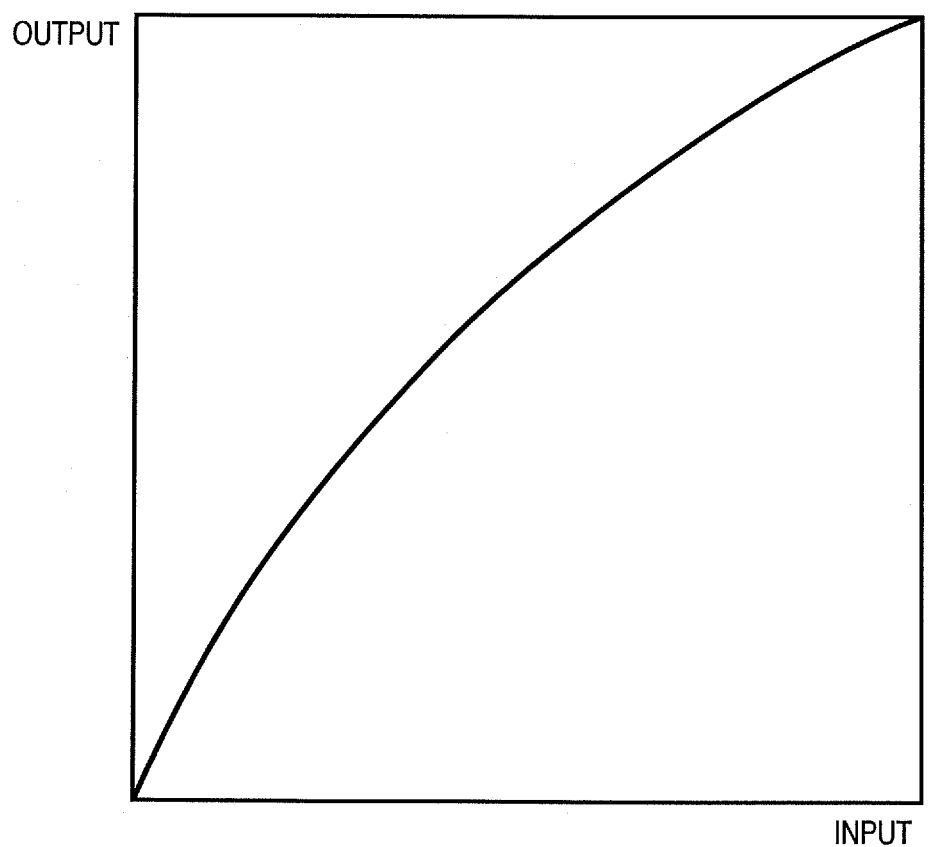
FIG. 2 is a diagram for explaining a gamma characteristic in a normal image sensing mode according to the first embodiment of the present invention.

FIG. 2 is a diagram for explaining a luminance gamma characteristic in the normal image sensing mode. The gamma characteristic in the normal image sensing mode is a characteristic adjusted to a gamma characteristic of a television monitor in the case of a moving image for example, or a characteristic suitable for display on a personal computer (PC) monitor or printing in the case of a still image. As the gamma characteristic, an output characteristic with respect to the input signal, such as shown in FIG. 2, is provided. For an ordinary object, an image with a most suitable level distribution can be obtained by making gamma conversion in accordance with the gamma characteristic for the normal image sensing mode, because the input level in a histogram expression distributes without any extreme irregularity from a dark level to a light level. On the other hand, in firework image sensing, the background is the dark sky and a firework of high luminance is imaged against the background and, therefore, the input level distribution in a histogram expression has such one-sidedness that almost the entire of the input signal is formed of signals of an extremely low level and signals of an extremely high level.

FIG. 4 shows an image of a firework obtained by performing image processing using the luminance gamma characteristic for the normal image sensing mode shown in FIG. 2. In firework image sensing, the background is the dark sky, as mentioned above. Random noise in a dark portion at the time of image sensing is generally noticeable and is a serious consideration in firework image sending in particular. Also, the smoke produced in firework is often lighted up by the light of the firework and appears in the image. In firework image sensing, a more preferable image can be obtained by performing image sensing so that firework smoke or the like, as well as random noise, is made as unnoticeable as possible.

Figure 3:
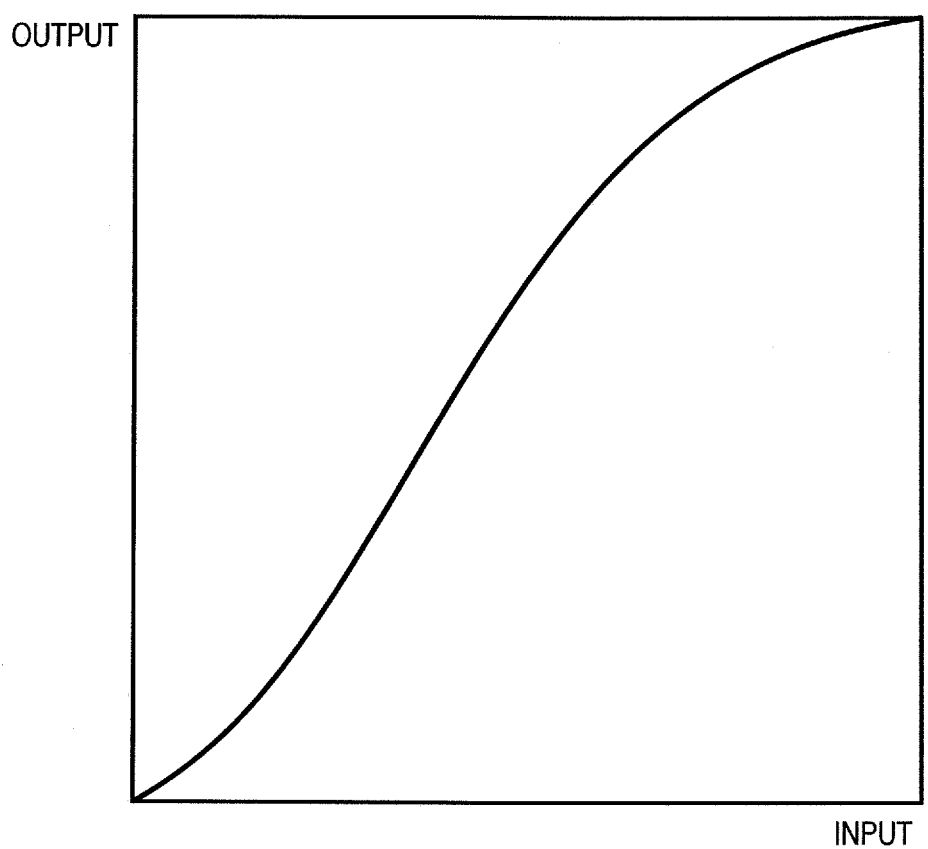
FIG. 3 is a diagram for explaining a gamma characteristic in a firework image sensing mode according to the first embodiment of the present invention.

FIG. 3 is a diagram for explaining a luminance gamma characteristic in the firework image sensing mode, which is the most characteristic in the first embodiment of the present invention. The luminance gamma characteristic in the firework image sensing mode comprises an output characteristic such as shown in FIG. 3. In comparison with the normal gamma characteristic shown in FIG. 2, the output in the gamma characteristic in the firework image sensing mode is reduced relative to that in the normal gamma characteristic for a wide lower-input-level range, and is increased relative to that in the normal gamma characteristic for a wide higher-input-level range. This is because a firework has such a level distribution in a histogram expression that almost the entire of the input signal is formed of signals of an extremely low level and signals of an extremely high level, as described above.

Accordingly, the output is reduced for a wider range in lower-input-level portions and is increased for a wider range in higher-input level portions. A characteristic therefore results such that the output level rises abruptly in an intermediate-input-level range. However, no particular problem arises even if such a gamma characteristic is adopted, since intermediate-level signals are few in an image of a firework.

Figure 5:
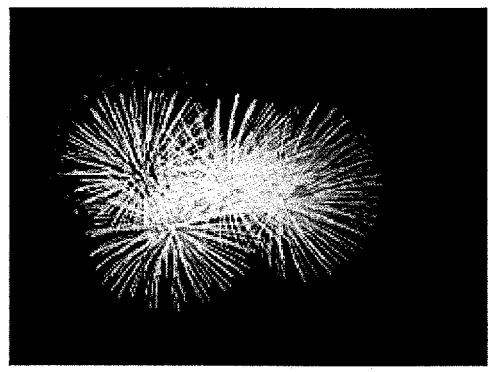
FIG. 5 is a diagram showing an example of an image processed on the basis of the gamma characteristic in the firework image sensing mode according to the first embodiment of the present invention.

FIG. 5 shows an image of a firework obtained by performing image processing using the luminance gamma characteristic for the firework image sensing mode shown in FIG. 3. As can be understood from FIG. 5, random noise is made unnoticeable and smoke of the firework is also unnoticeable in comparison with the image shown in FIG. 4.

The luminance gamma characteristic for the firework image sensing mode in the first embodiment of the present invention has the effect of darkening by suppressing signals of low input levels for a wider range in comparison with the characteristic in the normal image sensing mode, and thereby ensures that random noise in the dark portion becomes unnoticeable. The luminance gamma characteristic for the firework image sensing mode also has the effect of suppressing the output level corresponding to smoke generated by a firework and thereby ensures that firework smoke for example is unnoticeable. Further, the luminance gamma characteristic for the firework image sensing mode enhances signals of high input levels for a wider range in comparison with the characteristic in the normal image sensing mode, thereby achieving the effect of extracting a signal of a level corresponding to a firework. Thus, a user can easily take a high-contrast sharp firework image only by designating the firework image sensing mode.

Edge enhancement when the firework image sensing mode is selected will next be described.

When the normal image sensing mode is selected in the mode switch section 109, the mode control section 110 supplies normal edge enhancement data to the edge enhancement circuit 114. When the firework image sensing mode is selected in the mode switch section 109, the mode control section 110 supplies edge enhancement data suitable for firework image sensing to the edge enhancement circuit 114.

Figure 6:
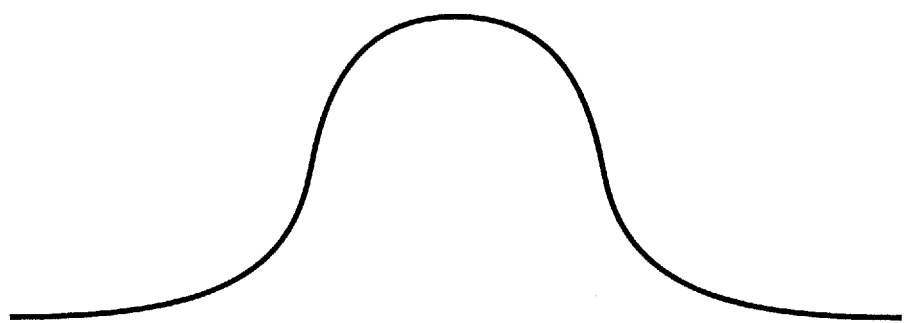
FIG. 6 is a diagram showing a signal before edge enhancement according to the first embodiment of the present invention.
Figure 7:
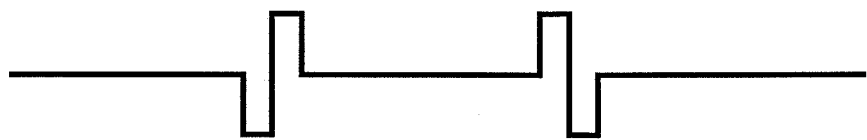
FIG. 7 is a diagram showing an edge enhancement signal according to the first embodiment of the present invention.
Figure 8:
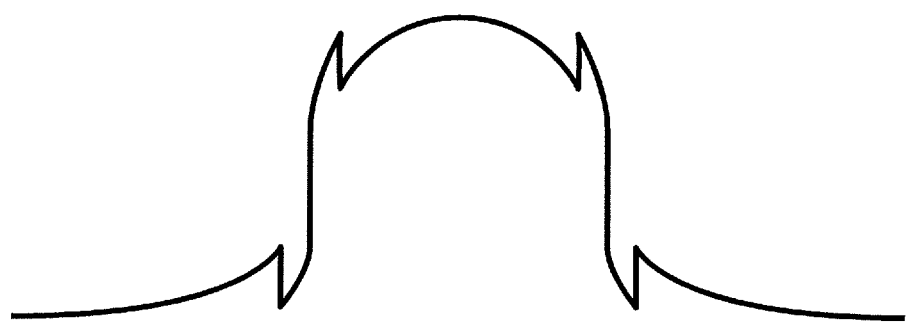
FIG. 8 is a diagram showing a signal after edge enhancement according to the first embodiment of the present invention.

FIG. 6 is a diagram showing an image signal before edge enhancement. FIG. 7 is a diagram showing an edge enhancement signal generated from the image signal of FIG. 6. FIG. 8 is a diagram showing an edge-enhanced image signal. In image sensing apparatuses, edge enhancement processing is ordinarily performed to improve the sharpness at the time of reproduction on a television monitor. Edge enhancement processing is a processing to add to an image signal an edge signal generated from a high-frequency component of the image signal in order to improve the apparent sharpness. When a signal such as shown in FIG. 6 is input to the edge enhancement circuit 114, the edge enhancement circuit 114 generates an edge enhancement signal such as shown in FIG. 7 and adds the edge enhancement signal to the original signal to output an image signal of improved sharpness such as shown in FIG. 8.

An edge-enhanced image signal has improved apparent sharpness but has a noticeable undershoot or overshoot in its edge portion. An image signal in the case of imaging a firework ordinarily has sufficiently high sharpness even if the edge enhancement amount is small, because a light portion of the firework rises abruptly against a dark portion. Further, since no objects other than fireworks are imaged in the firework image sensing mode, the edge enhancement amount can be set by assuming only a firework as a target. If a firework is imaged with performing edge enhancement suitable for an image produced by imaging an ordinary object, the edge is excessively enhanced so that a dark edge of an undershoot is noticeable around the firework. In firework image sensing, therefore, the edge enhancement amount is reduced to obtain an optimum image.

Chromaticity correction when the firework image sensing mode is selected will next be described. When the normal image sensing mode is selected in the mode switch section 109, the mode control section 110 provides a normal color gain to the chromaticity correction circuit 116. When the firework image sensing mode is selected in the mode switch section 109, the mode control section 110 provides a color gain suitable for firework image sensing to the chromaticity correction circuit 116.

In ordinary cases of imaging fireworks with a chromaticity setting adjusted to an ordinary object, the original color of the firework is seen in a faded condition since the luminance of the firework is high. To compensate for this condition, the mode control section 110 sets the color gain in the firework image sensing mode higher than the color gain in the normal image sensing mode. A sharp firework image can be obtained if the gain of the color signal is set higher in the firework image sensing mode than in the normal image sensing mode to increase the chromaticity.

At this time, white balance may be fixed in a state of being adjusted to sunlight or the like to enhance the effect of increasing the chromaticity.

The gamma characteristic, edge enhancement signal and chromaticity correction described above in the description of the first embodiment are only an example. A gamma characteristic different from that shown in FIG. 3, a different edge enhancement signal and chromaticity correction may be used for gamma conversion processing, edge enhancement processing and chromaticity correction processing, respectively, according to the kind of firework and the exposure period.

The first embodiment has been described for a case where gamma conversion is performed by providing a gamma curve to the gamma circuit 113. However, the above-described method of controlling gamma conversion is not exclusively used. Any of other various gamma conversion methods, e.g., one using a conversion equation, i.e., a method in which a variable for forming a conversion equation approximating the gamma curve shown in FIG. 3 when the firework image sensing mode is selected or as such a conversion equation itself is provided to the gamma circuit 113 may be used. Also, while the first embodiment has been described with respect to a case where only one gamma circuit is provided and the gamma characteristic is changed while the gamma circuit is being used in common between the normal image sensing mode and the firework image sensing mode, a different arrangement may be adopted in which a gamma circuit for the firework image sensing mode is separately provided and switch to the gamma circuit for the firework image sensing mode is made when the firework image sensing mode is selected.

There are various edge enhancement methods. For example, in the case of an edge enhancement circuit capable of obtaining different edge enhancement characteristics with respect to a small-amplitude signal portion and a large-amplitude signal portion, a setting described below is conceivable. That is, the amount of edge enhancement associated with a small amplitude is reduced to achieve edge enhancement suitable for a firework, while the amount of edge enhancement associated with a large amplitude is not changed between the normal image sensing mode and the firework image sensing mode. An edge enhancement circuit capable of obtaining an optimum image by changing the setting according to the characteristics of the edge enhancement circuit in the above-described way instead of simply reducing the edge enhancement amount when the firework image sensing mode is selected may be applied to the image sensing apparatus of the present invention.

In a case where a plurality of gamma characteristics in the firework image sensing mode are provided, the setting to increase the chromaticity may be changed according to each gamma characteristic, since the output according to the gamma characteristic in the firework image sensing mode is higher than that according to the normal gamma characteristic in a high-input-level range.

While the first embodiment of the present invention has been described with respect to an arrangement in which a diaphragm is used as a shutter, a different arrangement may be used in which, for example, a shutter is provided separately from a diaphragm or an electronic shutter implemented by controlling reset and accumulation of electric charge generated by photoelectric conversion in the image sensing unit 103.

Furthermore, the first embodiment is effective both in still image sensing and in moving image sensing and different gamma characteristics respectively associated with still image sensing and moving image sensing may be used.

Second Embodiment

A second embodiment of the present invention will be described.

Figure 9:
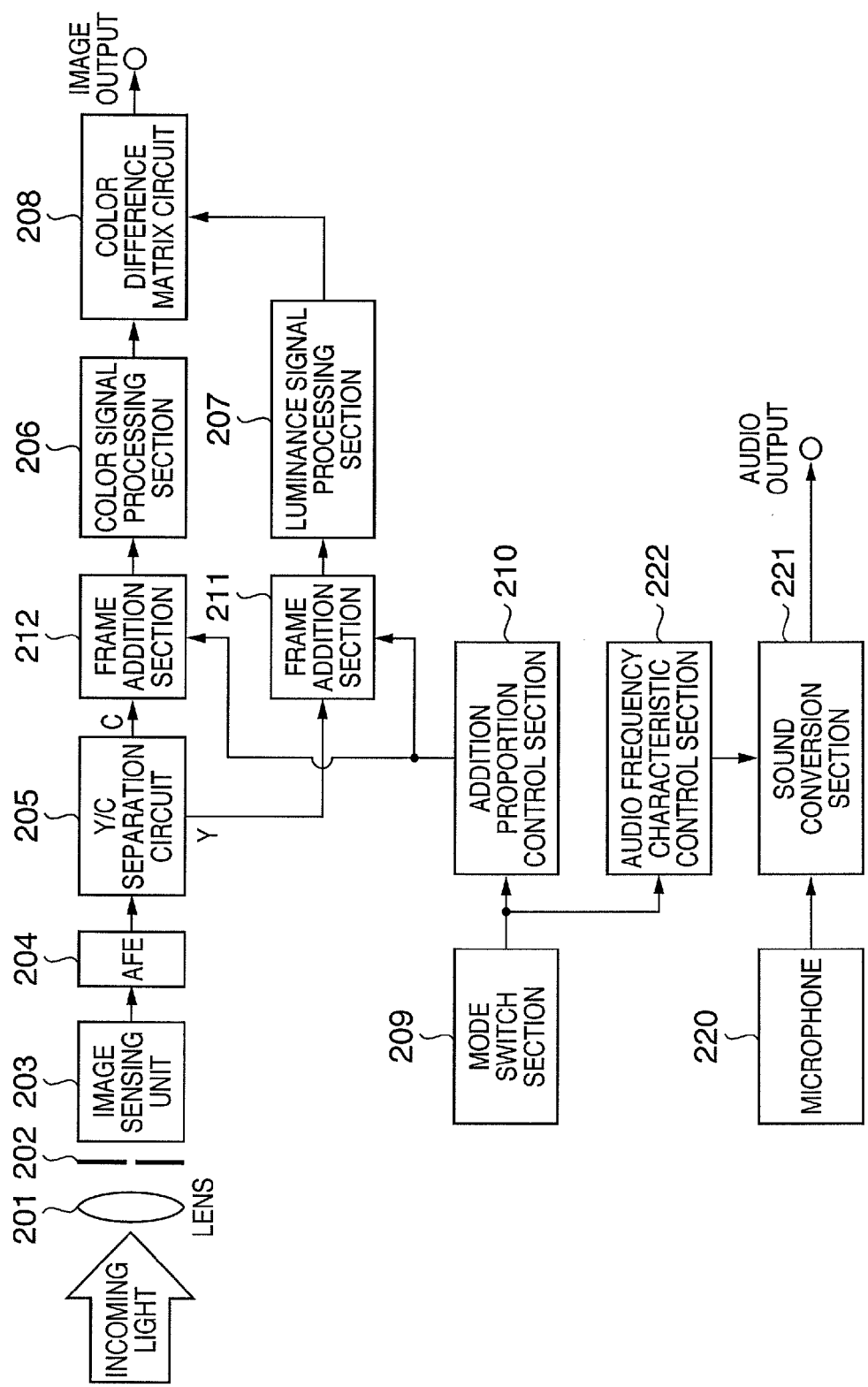
FIG. 9 is a block diagram showing the configuration of an image sensing apparatus according to a second embodiment of the present invention.

FIG. 9 is a block diagram of an image sensing system of a moving image sensing electronic camera schematically showing the second embodiment of the present invention. In FIG. 9, reference numeral 201 denotes a lens; reference numeral 202, a diaphragm for adjustment of exposure; reference numeral 203, an image sensing unit; reference numeral 204, an analog front end (AFE) that samples an output from the image sensing unit and performs A/D conversion of the sampled output; reference numeral 205, a Y/C separation circuit; reference numeral 206, a color signal processing section; reference numeral 207, a luminance signal processing section; reference numeral 208, a color difference matrix circuit; reference numeral 209, a mode switch section; reference numeral 210, an addition proportion control section; reference numeral 211, a frame addition section for adding a luminance signal (hereinafter referred to as "luminance frame addition section"); reference numeral 212, a frame addition section for adding a color signal (hereinafter referred to as "color frame addition section"); reference numeral 220, a microphone for audio input; reference numeral 221, a sound conversion section; and reference numeral 222, an audio frequency characteristic control section.

Light entering a lens 201 is controlled for suitable exposure by the diaphragm 202 and undergoes photoelectric conversion in the image sensing unit 203. An image signal obtained by photoelectric conversion in the image sensing unit 203 is read out on a frame-by-frame basis in a predetermined period. The image signal in each frame undergoes sampling and A/D conversion in the analog front end 204 and is separated into a luminance signal and a color signal in the Y/C separation circuit 205. The color signal separated in the Y/C separation circuit 205 is processed in the color frame addition section 212 in the way as described below, then undergoes signal processing relating to colors, such as white balancing, in the color signal processing circuit 206, and is thereafter input to the color difference matrix circuit 208. On the other hand, the luminance signal separated in the Y/C separation circuit 205 is processed in the luminance frame addition section 211 as described below, and is thereafter input to the luminance signal processing section 207. In the luminance signal processing section 207, the processed luminance signal undergoes processing including edge enhancement and gamma conversion. The luminance signal is thereafter input to the color difference matrix circuit 208. Then a color difference signal is formed in the color difference matrix circuit 208 and is output from this circuit.

Description will next be made of processing in the color frame addition section 212 and the luminance frame addition section 211.

Figure 10:
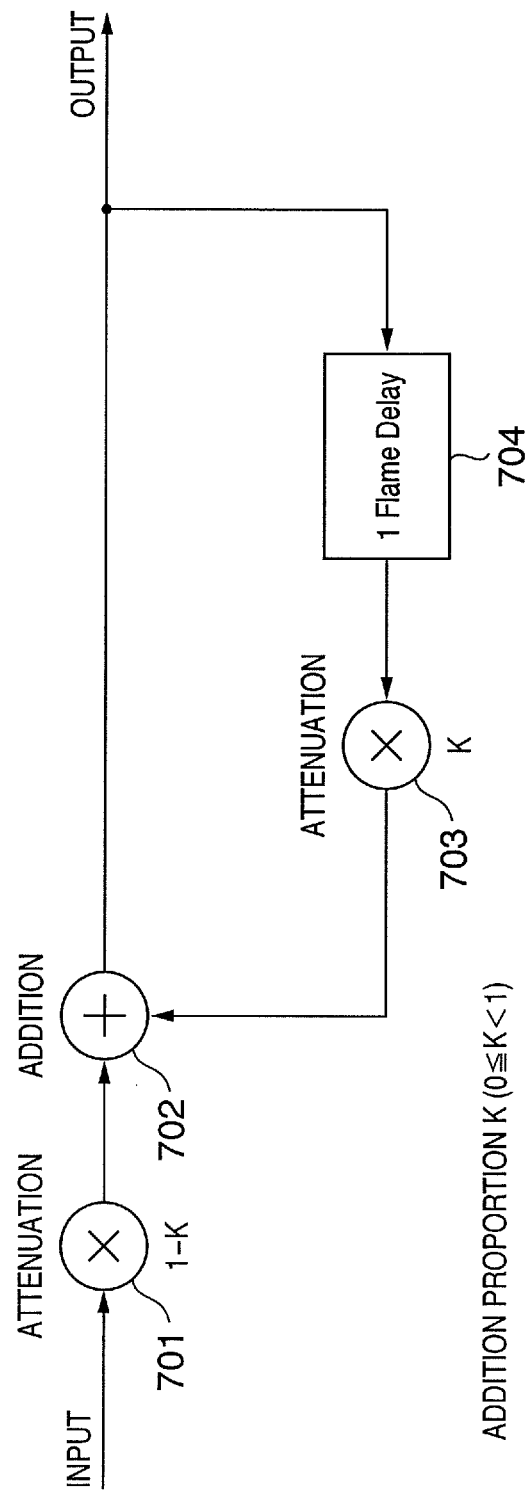
FIG. 10 is a block diagram showing the configuration of a frame addition section according to the second embodiment of the present invention.

FIG. 10 is a diagram for explaining addition circuits in the color frame addition section 212 and the luminance frame addition section 211. The color frame addition section 212 and the luminance frame addition section 211 are identical in configuration to each other. In FIG. 10, reference numeral 701 denotes an input signal attenuation circuit; reference numeral 702, an addition circuit; reference numeral 703, a delayed signal attenuation circuit; and reference numeral 704, a one-frame delay circuit. The frame addition sections are provided for the purpose of providing a special effect of enabling a moving object to be seen in a tailed state by attenuating past image data and adding the attenuated past image data to the current image data.

Referring to FIG. 10, an input signal is attenuated in advance according to an addition proportion (1−K) in the input signal attenuation circuit 701 and the attenuated signal and a past image signal are mixed or added together in the addition circuit 702. The signal obtained by this addition is one-frame delayed in the delay circuit 704, attenuated according to an addition proportion K in the delayed signal attenuation circuit 703 and is thereafter added to a new signal in the addition circuit 702. The addition proportion K takes a value in the range 0≤K<1. If the K is larger, the proportion of the delayed past image data is increased and the tailing effect becomes higher. The sum of the attenuation rates of the input signal attenuation circuit 701 and the delayed signal attenuation circuit 703 is 1 and the input signal level and the output signal level are equal to each other.

When the normal image sensing mode is selected by the mode switch section 209 in the above-described arrangement, the addition proportion control section 210 provides an addition proportion K=0 to the color frame addition section 212 and to the luminance frame addition section 211, thereby setting the addition proportion in the input signal attenuation circuit 701 to 1 and the addition proportion in the delayed signal attenuation circuit to 0. In the normal image sensing mode, therefore, the input signals are output from the color frame addition section 212 and the luminance frame addition sections 211 to the color signal processing section 206 and the luminance signal processing section 207, respectively, without being changed.

When the firework image sensing mode is selected by the mode switch section 209, the addition proportion control section 210 provides an addition proportion K (0<K<1) suitable for the firework image sensing mode to the color frame addition section 212 and to the luminance frame addition section 211. Frame addition is performed in both the color signal processing system and the luminance signal processing system to achieve a tailing effect both in color and in luminance.

Figure 11:
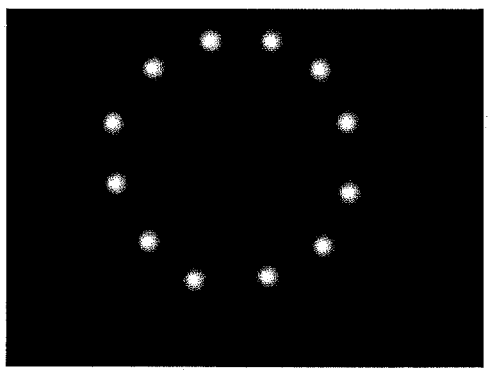
FIG. 11 is a diagram showing a one-frame image in a moving image in the conventional art.
Figure 12:
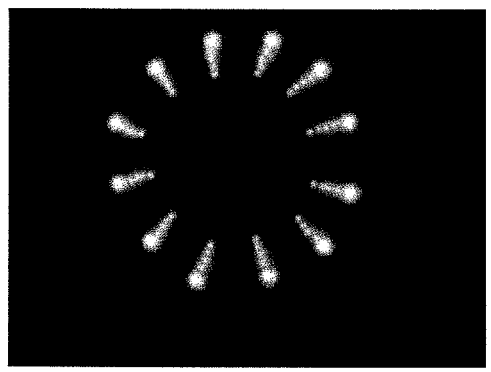
FIG. 12 is a diagram showing a one-frame image in a moving image taken in a firework image sensing mode according to the second embodiment of the present invention.

FIG. 11 is a diagram showing one-frame image of a firework imaged as a moving image in a period of 1/60 second. As shown in FIG. 11, the firework is imaged merely as dots when the exposure period is 1/60 second. When the firework is continuously seen in the moving image, it appears discontinuously. FIG. 12 is a diagram showing one-frame image of a firework imaged as a moving image in the same 1/60 second period by performing frame addition processing by means of the color frame addition section 212 and the luminance frame addition section 211. The delayed frame image remains inside of the firework as an afterimage in the firework, thus obtaining a smoothly tailed image, as shown in FIG. 12. When the firework is continuously seen in the moving image, it is recognized as an image with an afterimage, as seen with the human eye.

While the moving image sensing apparatus in the second embodiment is arranged to take a moving image, it may obtain a tailing effect in still image sensing of a firework by decreasing the shutter speed so that the exposure period is about 2 seconds.

According to the second embodiment, as described above, the effect of expressing a tailed state of a firework, that has been achieved only in still image sensing in the conventional art, can also be achieved in moving image sensing.

While the second embodiment has been descried with respect to a case where an image is readout on a frame-by-frame basis from the image sensing unit 203, the present invention is not limited to the described readout method. The present invention is also applicable in a case where an image is read out on a field-by-field basis. In such a case, sections corresponding to the frame addition sections 211 and 212 may add field images instead of frame images. In the case of addition of field images, however, a newly read field image and a field image read out one field period before differ in pixel position one pixel in the vertical direction. Therefore there is a need to add fields by ensuring correspondence in vertical pixel position. Alternatively, frame addition sections may be provided for respective fields.

The addition proportions in the color signal processing system and the luminance signal processing system may be different from each other. Also, the configuration may be modified by placing the frame addition section in a stage before the Y/C separation circuit 205.

In the image signal of a taken moving image, random noise is produced. In some cases, noise reduction processing is performed for the purpose of suppressing such random noise. A method using a frame correlation is known as one of noise reduction processing methods for reducing random noise. A noise reduction circuit may be used as the frame addition section in the second embodiment. For example, since the input signal is attenuated according to the addition proportion (1−K) in the input signal attenuation circuit, a noise signal that exists only in one frame of the image signal can be suppressed by performing frame addition. Also, if the addition proportion K is increased, the amount of attenuation of the signal existing only in the current frame is increased and, therefore, the random noise suppression effect is increased, as described above in the description of the second embodiment. In such a case, however, the influence of the image previously taken becomes considerable. For this reason, it is not preferable to increase the addition proportion K in imaging of an ordinary object. Therefore, a method is conceivable in which the frame addition section is used for the purpose of suppressing random noise by setting the addition proportion K to a smaller value in the normal image sensing mode, and is used to achieve random noise suppression and tailing as a synergistic effect by setting the addition proportion K to a larger value in the firework image sensing mode.

Thus, the same effect can also be obtained by changing the correlation ratio in the noise reduction circuit. In such a case, frame addition may also be performed by noise reduction in the normal image sensing mode. The present invention also comprises changing this ratio between the normal image sensing mode and the firework image sensing mode.

Description will next be made of audio processing.

Referring to FIG. 9, sound input through the microphone 220 is converted into an electrical signal, undergoes conversion of the audio frequency characteristics in the sound conversion section 221, then the processed signal is output. The audio frequency characteristic control section 222 sets in the sound conversion section 221 audio frequency characteristic conversion suitable for the image sensing mode selected by the mode switch section 209.

Figure 13:
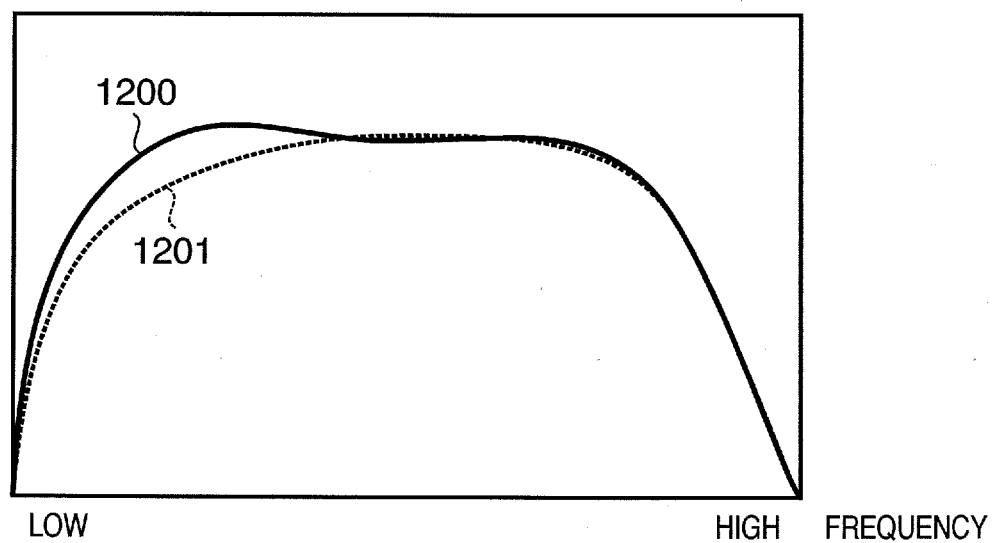
FIG. 13 is a diagram for explaining audio frequency characteristics according to the second embodiment of the present invention.
Figure 15:
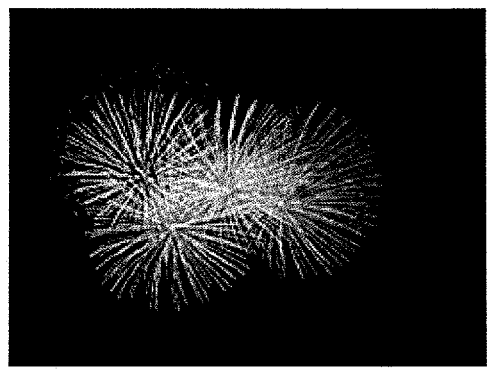
FIG. 15 is a diagram showing an example of a still image of the firework taken by 2 seconds exposure in the conventional art.

FIG. 13 is a diagram showing audio frequency characteristics of the electronic camera in the second embodiment of the present invention. In FIG. 13, dotted line 1201 indicates a frequency characteristic in the normal image sensing mode, while solid line 1202 indicates a frequency characteristic in the firework image sensing mode.

The sound pressure level of bass sound in live sound of an aerial firework is higher than that of ordinary bass sound. In ordinary cases, such sound cannot be suitably expressed by the audio frequency characteristic in the normal image sensing mode. To improve the firework sound more or less, the frequency characteristic is changed so as to boost the level in the bass range relative to that in the ordinary audio frequency characteristic in the case of setting the firework image sensing mode. The characteristic of the bass portion in the frequency characteristic 1201 in the normal image sensing mode shown in FIG. 13 is changed as expressed in the frequency characteristic 1200 in the firework image sensing mode, thereby improving powerfulness of the bass sound in the firework sound.

The audio frequency characteristic in the firework image sensing mode shown in FIG. 13 is only an example. The characteristics in other frequency bands may be changed as well as that in the bass range.

While the second embodiment has been described with respect to a moving image sensing electronic camera, the audio frequency changing processing suitable for firework image sensing performed when the firework image sensing mode is selected can be applied to devices capable of recording sound as well as to electronic cameras.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
    an image sensing unit that converts light into an electric signal corresponding to a quantity of incident light, and periodically outputs an image signal obtained by the conversion at intervals of a predetermined period;
    a mode switch that switches among a plurality of image sensing modes including at least a special image sensing mode and a normal image sensing mode;
    a delay unit that delays an image signal by the predetermined period;
    an attenuator that attenuates the image signal output from the image sensing unit and the image signal output from the delay unit according to set attenuation proportions;
    an adder that adds the attenuated image signals and outputs an image signal obtained by the addition; and
    a setting unit that sets the attenuation proportions used by the attenuator, according to the image sensing mode selected by the mode switch,
    wherein the delay unit delays the image signal obtained by addition performed by the adder, and
    wherein the setting unit sets the attenuation proportion of the image signal output from the delay unit higher in the special image sensing mode than in the normal image sensing mode.

2. The image sensing apparatus according to claim 1, wherein the special image sensing mode is a mode for capturing firework images.

3. The image sensing apparatus according to claim 1, wherein the setting unit makes a setting such that the sum of the attenuation proportion of the image signal output from the image sensing unit and the attenuation proportion of the image signal output from the delay unit is 1.

4. The image sensing apparatus according to claim 1, wherein the setting unit sets the attenuation proportion of the image signal output from the delay unit to zero in the normal image sensing mode.

5. A method of controlling an image sensing apparatus, comprising:

converting, in an image sensing unit, light into an electric signal corresponding to a quantity of incident light;

periodically outputting from the image sensing unit an image signal obtained by the conversion at intervals of a predetermined period;

switching among a plurality of image sensing modes including at least a special image sensing mode and a normal image sensing mode;

delaying an image signal by the predetermined period;

attenuating the image signal output from the image sensing unit and the delayed image signal according to set attenuation proportions;

adding the attenuated image signals;

outputting an image signal obtained by the addition; and setting the attenuation proportions to be used in the attenuation in accordance with the selected image sensing mode, wherein the image signal obtained by addition is further delayed, and the attenuation proportion of the delayed image signal is set higher in the special image sensing mode than in the normal image sensing mode.

6. The method according to claim 5, wherein the special image sensing mode is a mode for capturing firework images.

7. The method according to claim 5, wherein the setting of the attenuation proportions is made such that the sum of the attenuation proportion of the image signal output from the image sensing unit and the attenuation proportion of the delayed image signal.

8. The method according to claim 5, wherein the attenuation proportion of the delayed image signal is set to zero in the normal image sensing mode.

\* \* \* \* \*